July 23, 1968     O. MUELLER     3,393,582

DIFFERENTIAL TRANSMISSION

Filed July 28, 1966     5 Sheets-Sheet 1

INVENTOR
OTTO MUELLER

BY *Olsen and Stephenson*
ATTORNEYS

July 23, 1968    O. MUELLER    3,393,582
DIFFERENTIAL TRANSMISSION

Filed July 28, 1966    5 Sheets-Sheet 4

INVENTOR
OTTO MUELLER

BY Olsen and Stephenson
ATTORNEYS

July 23, 1968  O. MUELLER  3,393,582

DIFFERENTIAL TRANSMISSION

Filed July 28, 1966  5 Sheets-Sheet 5

INVENTOR
OTTO MUELLER

BY *Olsen and Stephenson*
ATTORNEYS

United States Patent Office 3,393,582
Patented July 23, 1968

3,393,582
DIFFERENTIAL TRANSMISSION
Otto Mueller, 13 Byfield Lane,
Dearborn, Mich. 48120
Filed July 28, 1966, Ser. No. 568,549
11 Claims. (Cl. 74—711)

ABSTRACT OF THE DISCLOSURE

A differential transmission for motor vehicles wherein the differential case contains a hydraulic mechanism responsive to relative turning of side gears of the differential for regulating the distribution of torque to the side gears. The case is formed in two sections, one section being an annulus fitted into the hollow end of the other section. The components of said mechanism are contained within said annulus.

---

The present invention relates to a differential transmission adapted primarily, but not exclusively, for use with motor vehicles. This invention is related to and includes improvements over differential transmissions of the type disclosed in prior United States Letters Patent No. 3,230,795.

It is an object of the present invention to provide an improved differential transmission.

It is another object of the present invention to provide an improved differential transmission which includes means for controlling distribution to the driven wheels of the input torque directed to the differential transmission, such means being constructed and arranged to permit normal differential action when the relative rate of turning between the driven wheels is below a predetermined amount and which means functions when the relative rate of turning progressively increases above the predetermined amount to distribute torque progressively more evenly to the driven wheels.

It is another object of the present invention to provide an improved differential transmission of the foregoing character which is constructed and arranged so that optimum torque transmitting characteristics are present in the differential throughout the full range of operation thereof.

It is another object of the present invention to provide an improved differential transmission of the foregoing character in which the means for controlling distribution of the input torque is an hydraulic mechanism which is adapted to use the fluid from the differential case for this purpose and which has improved means for replenishing itself when required because of the loss of fluid through leakage or the like.

It is still another object of the present invention to provide an improved differential transmission of the foregoing character in which the hydraulic mechanism is constructed and arranged so that during rotation of one driven-wheel relative to the other driven-wheel, fluctuations of fluid pressure in the mechanism are substantially minimized, thereby improving the operational characteristics of the transmission.

It is another object of the present invention to provide an improved differential transmission of the foregoing character which is constructed and arranged to facilitate assembly of the parts in an improved manner and to simplify the parts utilized in the manufacture of the transmission.

It is still another object of the present invention to provide an improved differential transmission of the foregoing character wherein at least one interchangeable flow control member is provided in the hydraulic mechanism for controlling the torque distribution.

It is still another object of the present invention to provide an improved differential transmission which is constructed and arranged so that its external dimensions will conform generally to those of the prior conventional differential transmission heretofore used, making it readily interchangeable with said prior transmissions.

According to one form of the present invention, there is provided a differential transmission comprising a casing adapted to contain lubricating fluid in its interior, and having a set of rotatable differential elements, such as gears or the like, mounted in the casing. One of the rotatable differential elements and the casing have radially facing circumferential portions and one of such portions includes a plurality of radially directed pressure chambers facing the other portion and being adapted to contain fluid. The other of said portions includes radially directed rise and fall cam surfaces. Spring biased pistons are positioned in said pressure chambers and are urged by the springs into engagement with the cam surfaces for effecting reciprocation of the pistons in response to rotation of the one rotatable differential element relative to the casing. The pressure chambers are in two sets, and restrictive passage means provide fluid communication between the two sets. The pressure chambers and the cam surfaces are arranged so that when rotation occurs between the casing and the one element, the pistons reciprocate to transfer the fluid in the pressure chambers back and forth between the sets via the passage means to the extent permitted by flow control means in the passage means. The differential transmission also has unidirectional passage means in communication with the interior of the case and the pressure chambers so that when the pistons reciprocate, pumping action will occur to maintain a supply of fluid in the chambers. When the transmission of the invention is in use in a motor vehicle it permits normal differential action when the relative rate of turning between the driven wheels is below a predetermined amount and functions, when the relative rate of turning progressively increases above the predetermined amount, to distribute torque progressively more evenly to the driven wheels. The feature of the pistons constantly replenishing the chambers assures that the differential will function in the intended manner even under the most adverse conditions, such as when substantial relative turning occurs between the casing and the one differential element.

According to another form of the present invention the pressure chambers are in three sets, and restrictive passage means provide communication between each set and the other two sets. The pressure chambers and cam surfaces are arranged so that when relative rotation occurs between the casing and the one element, the volumetric displacement of one set of pistons is always substantially equal to the algebraic sum of the volumetric displacement of the other two sets of pistons. Thus, for any given rate of relative rotation, the pressure in the hydraulic system will remain substantially constant, thereby assuring that optimum operating characteristics of the differential are obtained.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is capable of other embodiments and of being practiced or carried out in various ways. It is also to be understood that the phraseology or terminology employed herein is for the purpose of description and not of limitation.

Referring to the drawings, the embodiment of the invention illustrated in FIGS. 1–9, inclusive, will first be described in greater detail. The differential transmission 10 has a differential case or casing 12 which supports in the conventional manner a ring gear 14 which is adapted to be driven by a drive pinion 16. The differential case 12 is formed on two sections 18 and 20, and such sections are formed so that the outer configuration of the differential case 12 is substantially the same as that of conventional differentials used heretofore.

Supported within the differential case 12 is a set of differential elements or gears 22 which is mounted within the differential case 12 for receiving the input torque received from the drive pinion 16. The differential gear set 22 includes a pinion shaft 24 which extends through the case 12 and is secured in place therein by the bolts 26. Mounted on the pinion shaft 24 for rotation are the pinion gears 28. Thus, by virtue of the manner in which the pinion shaft 24 is mounted in the differential case 12, the assembly comprising the pinion shaft 24 and the pinion gears 28 is adapted to rotate with the differential case 12, in the conventional manner.

Also forming a portion of the differential gear set 22 are the side gears 30 and 32 whose teeth are in mesh with the pinion gears 28. These side gears 30 and 32 also have internal splines for receiving the splined ends of the driven axle shafts 34 and 36. The side gears 30 and 32 are conventional in construction except that the side gear 32 has a hub portion 38 which is or may be slightly shorter than the hub portion 40 of the other side gear 30. Formed adjacent to the side gear 32 and telescoped over the hub portion 38 is another rotatable differential element 42 which is an annular member having internal splines so that it also can be secured into the splined end of the axle shaft 36 for rotation together with axle shaft 36 and side gear 32. Thus, the annular member or rotatable differential element 42 functions as an integral extension of side gear 32, but is made a separable part primarily for manufacturing purposes.

Figure 1:
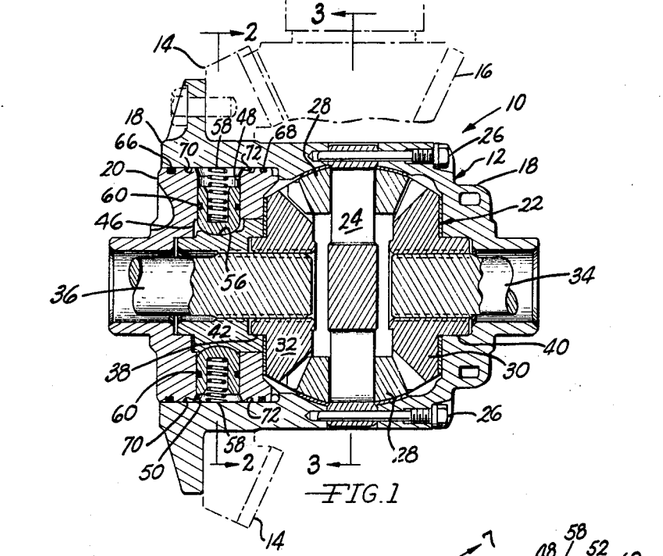
FIGURE 1 is a sectional view of one form of a differential transmission embodying the present invention.
Figure 2:
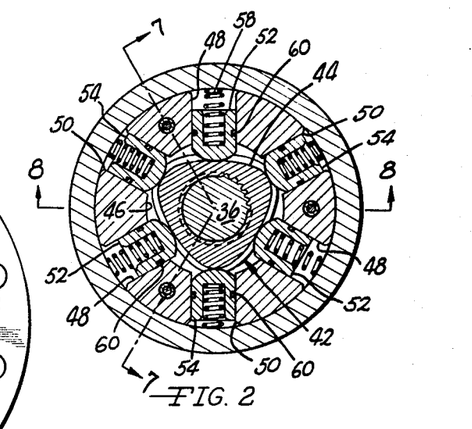
FIGURE 2 is a sectional view of the differential transmission, taken on the line 2—2 of FIG. 1.
Figure 3:
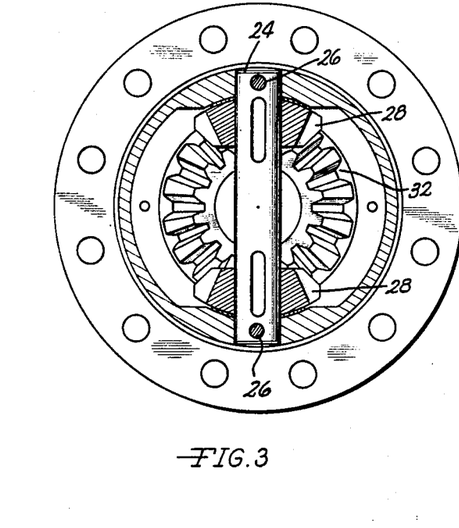
FIGURE 3 is a sectional view of the differential transmission, taken on line 3—3 of FIG. 1.
Figure 4:
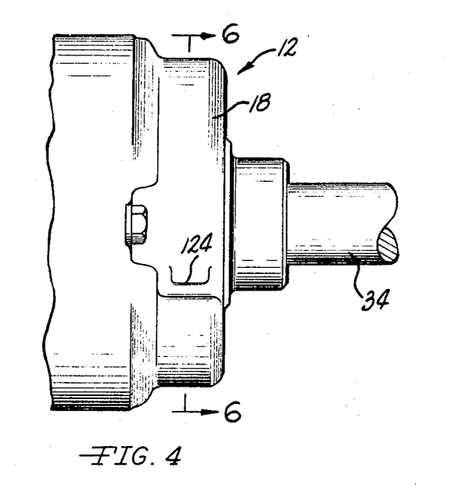
FIGURE 4 is a fragmentary front elevational view of one end of the differential transmission illustrated in FIG. 1.
Figure 5:
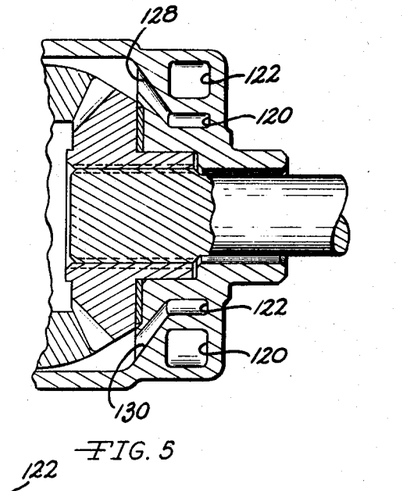
FIGURE 5 is a sectional view taken on the line 5—5 of FIG. 6.
Figure 6:
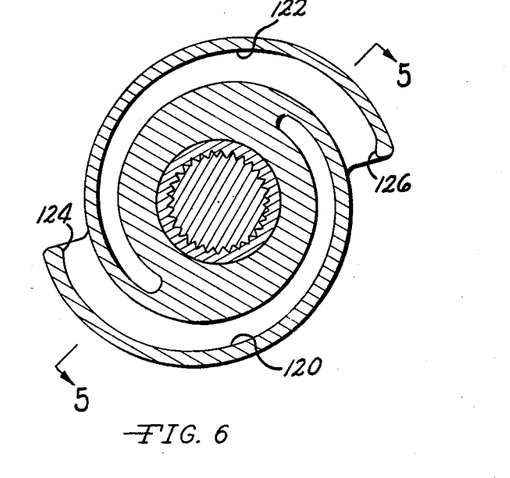
FIGURE 6 is a sectional view of the differential transmission, taken on the line 6—6 of FIG. 4.

As can be seen in FIG. 2 of the drawing, the annular member 42 has formed around its outer periphery a plurality of radially directed rise and fall cam surfaces 44. In the illustrated embodiment, three equiangular rise and fall portions are utilized. The three portions are arranged so that they will provide both dynamic and static balance.

The portion of the annular member 42 which contains the cam surfaces 44 is located radially inwardly of a complementary portion 46 in the section 20 of casing 12 in which are located a plurality of radially inwardly directed, circumferentially aligned pressure chambers 48 and 50 which are closed at their outer ends by the inner circumference of section 18 of casing 12. Located within the pressure chambers 48 and 50 are pistons 52 and 54 which are adapted to reciprocate therein. The radially inner ends of the pistons 52 and 54 are adapted to travel in the annular groove 56 formed in the cam surface 44. The pistons 52 and 54 have hollow interiors in which are located coil springs 58 for biasing the pistons 52 and 54 against the cam surface 44 so that the piston will reciprocate upon rotation of the annular member 42 relative to the casing 12. By virtue of the springs 58, the pistons will reciprocate irrespective of whether fluid is present in the pressure chambers, thereby producing a pumping action in a manner and for a purpose to be explained. The pistons 52 and 54 also have annular grooves around their circumferences in which are located O rings 60 for providing a more effective seal between the pistons 52 and 54 and the pressure chambers 48 and 50 during reciprocation of the pistons.

In order to provide fluid tight joints between the casing sections 18 and 20, grooves 62 and 64 are formed in the outer peripheries of the section 20 and in these grooves are located sealing or O rings 66 and 68. Also formed in the outer periphery of the section 20 are a pair of annular ducts 70 and 72, and for a more detailed description of these ducts and their relationships to the pressure chambers 48 and 50, attention is directed particularly to FIGS. 7, 8 and 9 of the drawings.

Figure 9:
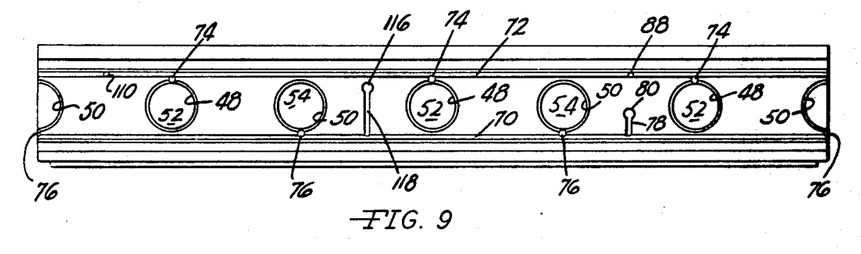
FIGURE 9 is a developed view of the circumferential surface of the casing section shown in FIGS. 7 and 8.

As shown particularly in FIG. 9, the pressure chambers 48 are each connected to and are in communication with the annular duct 72 by means of the short passageways or ducts 74. Similarly, the pressure chambers 50 are each connected to and are in communication with the annular duct 70 by means of short passageways or ducts 76. Thus, the pressure chambers 48 comprise one set of chambers which are in communication with each other by means of duct 72, and the pressure chambers 50 comprise a second set of chambers which are in communication with each other by means of the annular duct 70. The annular ducts 70 and 72 are also in communication with one another by a restricted passage means which comprises the transverse duct 78, the radially inwardly directed passageway 80, the axially directed enlarged passageway 82 which contains the externally threaded hollow screw 84 in which is floatingly retained the flow control pin 86, and the radially outwardly directed duct 88. For purposes of description, the hollow screw 84 and the flow control pin 86 may be referred to thereinafter as the flow control element 89. As can be seen best in FIG. 8, the pin 86 is retained in place by means of a plug or screw 90. The extent of fluid communication existing between the annular ducts 70 and 72 is restricted to the area of the flow passage that occurs between the external surface of the pin 86 and the internal bore of the screw 84. As can readily be understood, this effective cross sectional area through which fluid communication can occur can be selectively varied merely by removing the screw 90, after which the pin 86 can be replaced by another pin of a desired dimension different from that of pin 86, or the complete flow control element 89 may be removed and replaced by another one of desired flow characteristics.

By virtue of the ducts described and their relationship to the pressure chambers, it is to be understood that a closed hydraulic circuit is provided between the one set of pressure chambers 48 and the other set of pressure chambers 50. Thus, a closed system is provided which includes the pressure chambers 48 and 50 and the ducts connecting these sets of pressure chambers. When pistons 52 are at one end of their strokes, as shown in FIG. 2, the hydraulic fluid in the closed system, will be substantially all in such ducts and the pressure chambers 48. Conversely, when side gear 32 and the annular member 42 have rotated 60° relative to the differential case 12, the pistons 52 and the pistons 54 will have moved to the opposite ends of their strokes from the position shown in FIG. 2, resulting in the transfer of the hydraulic fluid from preassure chambers 48 to pressure chambers 50.

As is well known, so long as there is free relative rotation between the side gear 32 and the differential case 12, there will be unrestricted differential action permitted between axle shafts 34 and 36. However, if flow of the hydraulic fluid in the closed system, previously described, is restricted so that the pistons 52 and 54 cannot move freely, such differential action will be correspondingly restricted. The rate at which this differential action can occur is established by the flow control element 89. The greater the size of the flow passageway through the flow control element 89, the greater will be the rate of transfer of the hydraulic fluid back and forth between the pressure chambers 48 and 50. Thus, it can be understood that the flow control element 89 can be properly dimensioned to permit reciprocation of the pistons 52 and 54 to a preselected extent and thereby to allow limited relative turning of the annular member 42 or side gear 42 with respect to the differential case 12. After this point of limited relative turning has been reached, if greater differential action occurs between the annular member 42 and the differential case 12, the passage of the control element 89 will restrict the flow of the hydraulic fluid sufficiently to limit correspondingly the rate of reciprocable movement of the pistons 52 and 54, and thereby restrict the relative turning that can occur between the annular member 42 and the differential case 12. When this action occurs, the input torque to the differential case 12 will be distributed more nearly equally to each of the axle shafts 34 and 36. It will be recognized by those skilled in the art, that for the purpose of carrying out this operation, the volume of fluid in the pressure chambers 48 and 50 can be relatively small, the essential feature being that the circuit is a closed one so that there will always be equal and opposite movement of the two sets of pistons 52 and 54 in response to any travelling on cam surfaces 44.

It will be understood that the fluid in the closed system will constantly be under pressure when differential action occurs between case 12 and the side gear 32 or annular member 42 and therefore, it is desirable that effective seals be provided for the closed hydraulic system. For this purpose, the O rings 68 and 66 are provided between the sections 18 of the differential case 12.

Figure 7:
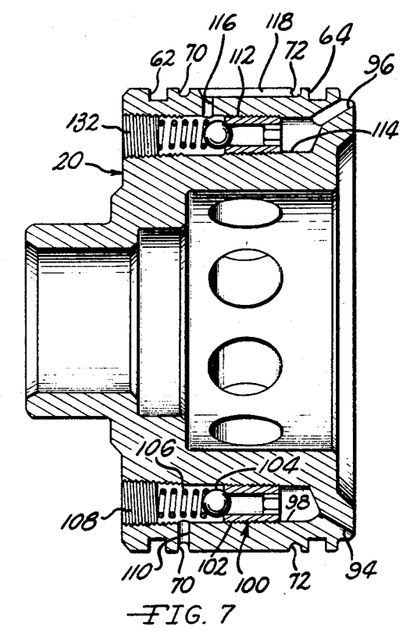
FIGURE 7 is a fragmentary section of one part of the differential casing, taken on the line 7—7 of FIG. 2.
Figure 8:
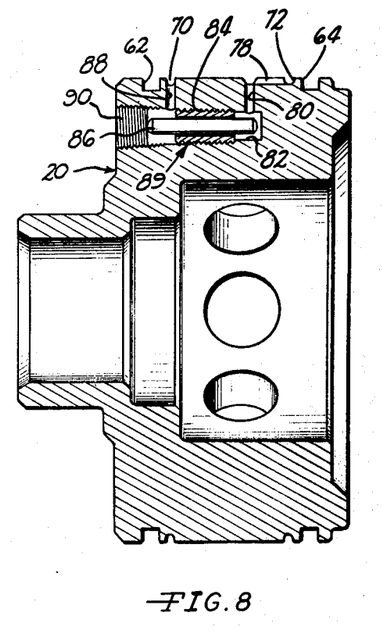
FIGURE 8 is another fragmentary section of one part of the differential casing, taken on the line 8—8 of FIG. 2.

It is recognized that the pressurized hydraulic fluid in the closed system may leak therefrom to a limited extent, and such leakage would occur mainly during such periods of time when maximum relative rotation occurs between the annular member 42 and the casing 12. Therefore, means are provided for replenishing such hydraulic fluid, and the novel means of the present invention are provided to function so that the fluid will be replenished at the maximum rate when the maximum relative rotation occurs between the annular member 42 and the differential case 12. This is accomplished by means of two passageways or ducts 94 and 96 which are in fluid communication respectively with the annular ducts 70 and 72. Referring to FIG. 7, it will be observed that the duct 94 has an opening at one end which is in direct communication with the interior of the differential case 12. The other end of the duct 94 is in communication with an enlarged passageway 98 in which is located a unidirectional or ball-check valve 100. The latter has a hollow sleeve 102 which is threadedly connected to the interior of the passageway 98, and a ball 104 is seated on the one end of the sleeve 102 and is retained in place by the coil spring 106. A suitable access screw 108 retains the ball and coil spring 106 in their operative positions. In communication with the interior of the enlarged pasageway 98 and with the annular duct 70 is a radially directed passageway or duct 110. By virtue of the described unidirectional liquid supply passageway, hydraulic fluid from the interior of the casing 12 can be supplied to the duct 70 by virtue of the pumping action of the pistons 54, and the ball check valve 100 will prevent discharge of the hydraulic fluid in the closed system back through the unidirectional passageway during reciprocating movement of the pistons.

A similar hydraulic fluid supply passageway is provided to the annular duct 72. As also seen in FIG. 7, a ball check valve 112 is provided in the enlarged passageway 114 for preventing return of hydraulic fluid from the annular duct 72 to the interior of the differential case 12, by permitting flow of hydraulic fluid to the annular duct 72 as a result of the pumping action of the pistons 52. It will be observed that the unidirectional passage means to the duct 72 includes the radial duct 116 and the transverse duct 118, which provides communication between the annular duct 72 and the radial duct 116.

From the foregoing description it is believed to be readily understood that the two sets of pistons 52 and 54 function during such time when there is relative rotation between the rotatable differential elements 32 and 42 with respect to the differential case 12 to pump hydraulic fluid from the interior of the differential case 12 into either or both of the annular ducts 72 and 74 of the closed hydraulic system. So long as the hydraulic system is filled with hydraulic fluid, there will be no suction of hydraulic fluid from the interior of the differential case 12 into the closed hydraulic system.

The present differential transmission is constructed so that it also assures that a constant supply of hydraulic fluid will be present in the interior of the differential case 12. For this purpose, the section 18 of the differential case 12 has formed in its one end a pump comprising a pair of scoop tube constructions 120 and 122, see FIG. 6, which have inlet openings 124 and 126 for scooping differential fluid from the interior of the differential housing, not shown, during rotation of the differential case 12, and such hydraulic fluid is discharged into the interior of the differential case through the discharge outlets 128 and 130.

It is believed that the operation of first form of the present invention is now fully understood. In summary, substantially equal proportions of the input torque to the differential case 12 will be distributed to the axle shafts 34 and 36 when the driven wheels, not shown, have equal traction. When one of the wheels looses its traction or for any other reason begins to spin relative to the other wheel, the side gear 32 and associated annular member 42 will turn relative to the differential case 12, causing reciprocation of the pistons 52 and 54. However, the rate of said reciprocation will be restricted by the rate at which hydraulic fluid can pass through the passageway in the flow control element 89. This has the effect of partially restricting reciprocation of pistons 52 and 54, which thereby restricts free relative turning of the side gear 32 and annular member 42 with respect to the differential case 12. When so restricted, portions of the input torque will be distributed via side gears 30 and 32 to each of the driven wheels. However, normal and desired differential action can be obtained when turning corners, or the like, because under such conditions the relative rate of turning between the differential case 12 and the side gear 32 and associated annular member 42 is small.

The present invention also functions to assure proper locking action of the differential throughout its normal range of operation. This assurance of uniformly proper action throughout the range of operation of the differential is realized at least in part by the described improved hydraulic replenishing system for assuring that the closed system will always be filled with fluid. If loss or a partial loss of hydraulic fluid should occur from the closed hydraulic system, it will occur during the time that maximum reciprocation occurs of the two sets of pistons, because this is the time when the hydraulic fluid in the closed system is subjected to the highest pressure. However, by virtue of the pumping system provided, if there is a loss of such fluid, the pumping system will act simultaneously in the most effective manner to replace the lost fluid with fluid from the interior of the differential case 12. Thus, the pumping system is replenishing the closed system with hydraulic fluid as fast as the fluid may be lost by leakage from the closed system. This assures that the proper locking action occurs throughout the range of operation of the differential transmission.

It is also to be observed that the present pumping system reduces to a minimum the number of parts that are required since a separate pump is not required for replenishing the fluid to the closed hydraulic system, because the pistons which act to lock the annular member 42 to the differential case 12 also serve the dual function of being the pumping elements for the system.

It is also to be observed that access to the two check valves in the pumping system as well as to the flow control element 89 can be readily obtained by removing the screws 90, 108, or 132, as the case may require.

Figures 10, 11, 14:
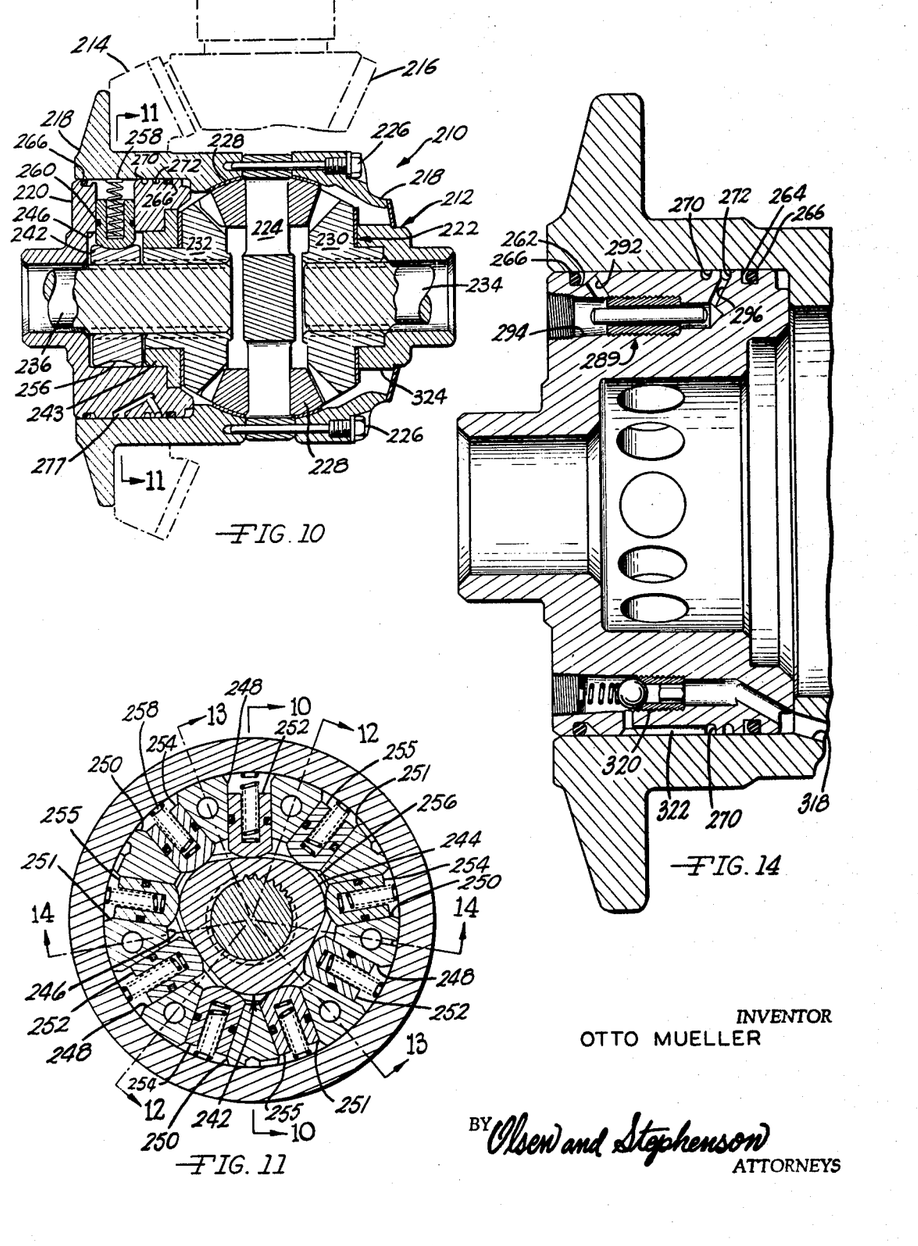
FIGURE 10 is a sectional view of another form of a differential transmission embodying the present invention.
FIGURE 11 is a sectional view of the transmission, taken on the line 11—11 of FIG. 10.
FIGURE 14 is an enlarged fragmentary section of the differential, with parts removed on the line 14—14 of FIG. 11.

Referring to FIGS. 10–16, inclusive, the embodiment of the invention there illustrated will next be described. The differential transmission 210 is constructed quite similar to the form of the invention previously described, and many of the components are the same. Accordingly, principal emphasis in describing the differential transmission 210 will be placed on those parts which differ from the corresponding part in the first form of the invention. The principal difference between the embodiments in FIG. 1 and in FIG. 10 is that in the latter more than two sets of pistons and pressure chambers are employed and the rise and fall cam surfaces are constructed and arranged so that the pressure of the hydraulic fluid that is displaced as a result of reciprocation of the pistons will remain generally constant for any fixed rate or relative turning between the differential case and the side gears. This differs from the first form of the invention wherein only two sets of pressure chambers are employed resulting in a momentary pause of fluid transfer, causing a fluctuation in the torque bias value, each time the pistons of the two sets reverse their direction of movement.

The differential transmision 210 has a differential case or casing 212 which supports in the conventional manner a ring gear 214, which is adapted to be driven by a pinion 216. The differential case 212 is formed in two sections 218 and 220, and such sections are formed so that the outer configuration of the differential case 212 is substantially the same as that of conventional differentials heretofore in use. Supported within the differential case 212 is a set of differential elements or gears 222 which is mounted within the differential case 212 for receiving the input torque received from the differential pinion 216. The differential gear set 222 includes a pinion shaft 224 which extends through the case 212 and is secured in place therein by the bolts 226. Mounted on the pinion shaft 224 for rotation are the pinion gears 228.

Also forming a portion of the differential gear set 222 are the side gears 230 and 232, whose teeth are in mesh with the pinion gears 228. These side gears 230 and 232, also have internal splines to receive the splined ends of the driven axle shafts 234 and 236. The side gears 230 and 232 are conventional in construction. Formed adjacent to the side gear is another rotatable differential element 242 which is an annular member having internal splines so that it also can be secured onto the splined end of the axle shaft 236 for rotation together with axle shaft 236 and side gear 232. A supporting ring 243 is mounted on the hub portion of the side gear 232 so that conventional side gears 232 and 230, of identical construction, can be employed in connection with this form of the invention. Also, by virtue of the described arrangement, the annular member or rotatable differential element 242 functions as an integral extension of side gear 232, but is made a separable part primarily for manufacturing purposes.

As can be seen in FIG. 11 of the drawing, the annular member 242 has formed around its outer periphery a plurality of radially directed rise and fall cam surfaces 244. In the illustrated embodiment, three equiangular rise and fall portions are utilized. The three portions are arranged so that they will provide both dynamic and static balance.

The portion of annular member 242, which contains the cam surfaces 244, is located radially inwardly of a complementary portion 246 in the section 220 of casing 212 in which complementary portion are located a plurality of radially inwardly directed, circumferentially aligned pressure chambers 248, 250 and 251 which are closed at their outer ends by the inner circumference of section 218 of case 212. Located within the pressure chambers 248, 250 and 251 are pistons 252, 254 and 255 which are adapted to reciprocate therein. The radially inner ends of pistons 252, 254, 255 are adapted to travel in the annular groove 256 formed in the cam surface 244. The pistons 252, 254 and 255 have hollow interiors in which are located coil springs 258 for biasing the pistons against cam surface 244 so that the piston will reciprocate upon rotation of the annular member 242 relative to the casing 212. By virtue of the springs 258, the pistons will reciprocate irrespective of whether or not fluid is present in the pressure chambers, thereby producing a pumping action in the same manner as was described with respect to the corresponding parts in the form of the invention shown in FIGS. 1–9. The pistons 252, 254, and 255 also have annular grooves around their circumferences in which are located O rings 260 for providing a more effective seal between the pistons and the pressure chambers during reciprocation of the pistons.

In order to provide fluid tight joints between the casing sections 218 and 220, grooves 262 and 264 are formed in the outer peripheries of the section 220, and in these grooves are located sealing or O rings 266. It will be observed that the groove 262 is relatively wide so that it can also function as a duct for the passage of a fluid. Also, formed in the outer peripheries of the section 220 are two additional annular ducts 270 and 272. For a more detailed description of ducts 262, 270, and 272, attention is directed particularly to FIGS. 12, 14 and 15.

Figure 15:
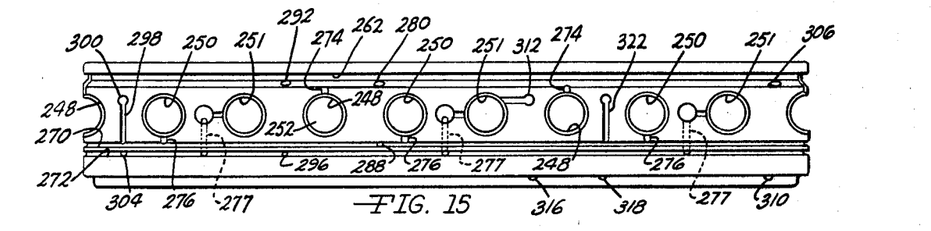
FIGURE 15 is a developed view of the circumferential surface of the casing section shown in FIGS. 12, 13 and 14.

As shown particularly in FIG. 15, the pressure chambers 248 are each connected to and are in communication with the annular duct 262 by means of the short passageways or ducts 274. Similarly, the pressure chambers 250 are each connected to and are in communication with the annular duct 270 by means of the short passageways or ducts 276. In a like manner, the pressure chambers 251 are each connected to and are in communication with the annular duct 272 by means of the ducts 277. Thus, the pressure chambers 248 comprise one set of chambers which are in communication with each other by means of duct 262, the pressure chambers 250 comprise a second set of chambers which are in communication with each other by means of the annular duct 270, and the pressure chambers 251 comprise a third set of chambers which are in communication with each other by means of the annular duct 272.

Figure 12:
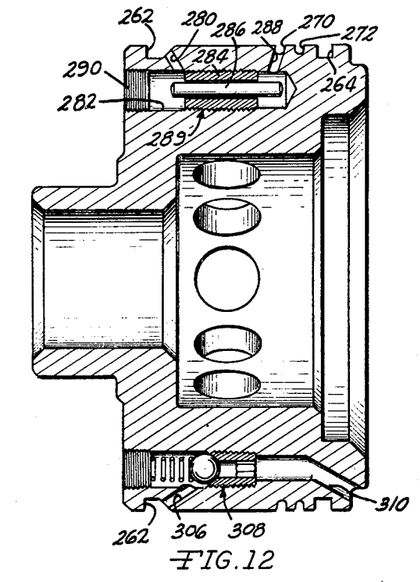
FIGURE 12 is an enlarged fragmentary section of one part of the differential casing, taken on the line 12—12 of FIG. 11.

As best seen in FIG. 12, the annular ducts 262, and 270 are also in communication with one another by a restricted passage means which comprises the passageway 280, the axially directed enlarged passageway 282, which contains the externally threaded hollow screw 284 in which is floatingly retained the flow control pin 286, and the radially outwardly directed duct 288. For the purposes of description the hollow screw 284 and the flow control pin 286, may be referred to hereinafter as the flow control element 289. The pin 286 is retained in place by means of the plug or screw 290. The flow control element 289 is constructed and functions the same as the element 89 described in connection with the form of the invention shown in FIGS. 1–9 inclusive, and reference is made to the description of the flow control element 89 for a complete understanding of the operation and construction of flow control element 289.

Referring to FIG. 14, it will be seen that the annular duct 262 and the annular duct 272 are also in communication with one another by a restricted passage means which comprises the passageway 292, the axially directed enlarged passageway 294 which contains another flow control element 289, and the passageway 296. Thus, the extent of fluid communication existing between the angular ducts 262 and 272 is also controlled by means of a flow control element 289.

Figure 13:
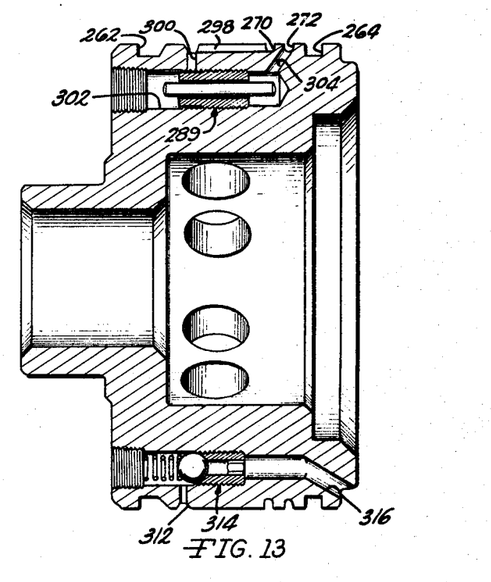
FIGURE 13 is another enlarged fragmentary section of one part of the differential casing, taken on the line 13—13 of FIG. 11.

As seen in FIG. 13, the annular ducts 270 and 272, are also in communication with one another by a restricted passage means which comprises the transverse duct 298, the radial duct 300, the axially directed enlarged passageway 302, which contains another flow control element 289, and the passageway 304. Thus, the extent of fluid communication existing between the annular ducts 270 and 272 is controlled by means of a flow control element 289. By virtue of the ducts described and their relationship to the pressure chambers, it is to be understood that a closed hydraulic circuit is provided between each of the sets of pressure chambers 248, 250, and 251 and the other two sets of pressure chambers.

It will be observed that in the embodiment of the invention shown in FIG. 10, a total of nine pressure chambers are arranged equiangularly about the axis of rotation of the cam surfaces 244 so that the pressure chambers are disposed 40 degrees apart. The cam surfaces 244 are shaped so that when relative rotation occurs between said casing 212 and side gear 232, the pistons in each set reciprocate out of phase with the pistons of the other two sets and transfer the fluid in the pressure chambers back and forth therebetween via the passage means provided and to the extent permitted by the flow control means 289 located in the passage means between each pair of annular ducts. The pressure chambers and the cam surfaces are constructed and arranged so that when relative rotation occurs between said casing and the side gear, the volumetric displacement of one set of pistons for any selected time interval is substantially equal to the algebraic sum of the volumetric displacement of the other two sets of pistons.

Figure 16:
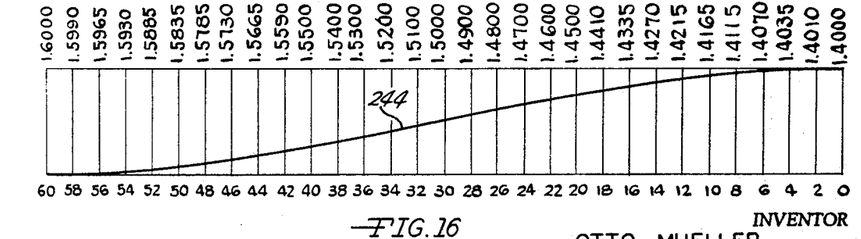
FIGURE 16 is a developed profile of sixty degrees of the cam surface showing the extent of rise or fall with respect to the cam in the form of the invention shown in FIG. 10.

One example of a configuration of a portion of a cam surface which is constructed to perform in this manner can be seen in FIG. 16. The shape of the cam surface 244 is shown in a developed form, and it will be observed that the numbers extending across the bottom of the figure represent 60 degrees of cam surface. The numbers at the top of the figure represent the cam rise or fall from its maximum to its minimum position as determined from a base position. Thus, the total rise is 0.2. In view of the fact that the pistons are located 40 degrees apart, it can be determined readily that if the rise or fall cam dimensions are selected at 40 degree intervals, the total for any such three figures selected will be a constant of 4.5. Thus, if one of the pistons is located at the zero degree point, its dimension from the base position is 1.4000, the next piston will be located at the 40 degree point, and for this location the dimension from the base position will be 1.5500, and the next piston will be located at a point corresponding to 80 degrees, which will again be a dimension of 1.5500. This latter dimension can be obtained by returning 20 degrees from the 60 degree position. By totaling the three dimensions, it will be observed that the total is 4.5. Similarly, if the rise or fall cam figure is taken at 8°, at 48° and at 88°, it will be found that the cam rise or fall figure represents 1.4115, 1.5785 and 1.5100. When these figures are added together it will again be observed that the sum is 4.5. Thus, as the pistons are reciprocating, the volume of fluid being displaced is always a constant. This has the effect of maintaining a substantially constant pressure throughout the system whenever relative rotation occurs between the casing 212 and the side gear 232. Such an arrangement is found to be particularly desirable because it substantially eliminates noise and also improves the operational characteristics of the differential transmission. It is believed to be readily apparent that when a more simplified form of the present invention is employed wherein only two sets of pistons and associated pressure chambers are employed, the hydraulic fluid in the closed system fluctuates between a condition of no pressure at that instant of time when the flow of fluid between the two sets of pressure chambers is being reversed to a maximum of pressure when the fluid is being transferred in one direction from the one set of pressure chambers to the other set of pressure chambers. Thus, in the simplified form, the torque bias value is reduced considerably at the instant when the flow of fluid between the two sets of pressure chambers is being reversed.

In the form of the invention shown in FIGS. 10–16, inclusive, a hydraulic fluid supply system to each of the annular ducts 262, 270 and 272 is provided which is essentially the same as that described in connection with the first form of the invention illustrated in FIGS. 1–9, inclusive. Thus, as seen in FIG. 12, the annular duct 262 is associated with passageway 306, ball check valve 308, and passageway 310 for receiving hydraulic fluid from the interior of the differential case 212 by virtue of the pumping action of the pistons 252 if the annular duct 262 requires replenishing. Similarly, by reference to FIG. 13, it will be observed that radial duct 312, ball check valve 314 and passageway 316 provides a unidirectional passageway for supplying hydraulic fluid to one of the cylinders 251 which is in communication with the annular duct 272. Similarly, as shown in FIG. 14, the fluid supply in annular duct 270 can be replenished by means of the passageway 318, the ball check valve 320 and the passageway 322.

Thus, it is believed clear that the form of the invention shown in FIGS. 10–16 will function in essentially the same manner as the form of the invention shown in FIGS. 1–9 and has the additional feature of maintaining nearly constant torque bias at any given relative speed between the two driven shafts. Scoop means are also provided via the passageways 324, FIG. 10, for maintaining a constant supply of hydraulic fluid in the differential case 212. The full details of the scoop arrangement are not shown in FIG. 10, but it is to be understood that they are essentially the same as the scoop means provided in the first form of the invention.

The embodiments of the invention in which an exclusive property or privilege is claimed are defined as follows:

1. A differential transmission comprising a casing containing lubricating fluid in its interior, a set of rotatable differential elements mounted in said casing, one of said rotatable differential elements and said casing have radially facing circumferential portions, one of said portions including a plurality of radially directed pressure chambers facing the other portion and containing fluid, the other of said portions including radially directed rise and fall cam surfaces, said casing including two sections secured together, one of said sections being a cylindrical annulus fitted into the end of the other section and having a plurality of radial openings closed at their radially outer ends by the other of said sections so as to define said pressure chambers, spring biased pistons in said pressure chambers urged into engagement with said cam surfaces for reciprocation in response to rotation of said one rotatable differential element relative to said casing, said pressure chambers being a plurality of sets, restrictive passage means providing fluid communication between the plurality of sets of pressure chambers, said pressure chambers and said cam surfaces being arranged so that when rotation occurs between said casing and said one element the pistons reciprocate to transfer the fluid in the pressure chambers back and forth therebetween via said passage means to the extent permitted by said passage means, and unidirectional passage means in communication with the interior of said case and said chambers for supplying fluid to said chambers in response to reciprocating movements of said pistons.

2. A differential transmission according to claim 1, wherein said one rotatable differential element comprises an internally splined annular member adapted to be splined to a shaft extending into said casing, said annular member being mounted radially inwardly of said cylindrical annulus and embodying on its outer circumference the other of said radially facing portions.

3. A differential transmission according to claim 1, wherein said restrictive passage means include ducts formed between adjacent surfaces of said two sections.

4. A differential transmission according to claim 3, wherein the ducts correspond in number to the number of said sets, each such duct being in communication respectively with a different one of the sets of pressure chambers, and wherein flow control means are in said passage means in communication with pairs of said ducts for controlling the rate of fluid flow between the sets of pressure chambers.

5. A differential transmission according to claim 4, wherein each flow control means is removable from said casing for replacement selectively by a flow control means of different capacity.

6. A differential transmission according to claim 1, wherein flow control means are in said restrictive passage means for controlling the rate of fluid flow between the sets of pressure chambers, said flow control means being removable for replacement selectively by a flow control means of a different capacity.

7. A differential transmission according to claim 1 wherein said unidirectional passage means includes parallel supply ducts, each duct communicating respectively with one of said sets of pressure chambers, and a check valve in each of said supply ducts permitting flow only in a direction from the interior of the casing to the associated set of pressure chambers.

8. A differential transmission comprising a casing for transmitting an input torque, set of rotatable differential elements mounted in said casing, one of said rotatable differential elements and said casing having radially facing circumferential portions, one of said portions including a plurality of radially directed pressure chambers facing the other portion and adapted to contain fluid, the other of said portions include radially directed rise and fall cam surfaces, pistons in said pressure chambers operatively engaging said cam surfaces for reciprocation in response to rotation of said one rotatable differential element relative to said casing, said pressure chambers being in at least three sets, restrictive passage means providing fluid communication between each set of pressure chambers and each of the other sets of pressure chambers, said pressure chambers and said cam surfaces being arranged so that when relative rotation occurs between said casing and said one element the pistons in each set reciprocate out of phase with the pistons of the other sets and transfer the fluid in the pressure chambers back and forth therebetween via said passage means to the extent permitted by said passage means, said pressure chambers and said cam surfaces being arranged so that when relative rotation occurs between said casing and said one element the volumetric displacement of one set of pistons for any selected time interval is substantially equal to the alegbraic sum of the volumetric displacement of the other two sets of pistons.

9. A differential transmission according to claim 8, wherein said rise and fall cam surfaces are at least three in number which are equiangularly arranged around said other portion.

10. A differential transmission according to claim 8, wherein the pressure chambers in each set are equiangularly arranged around said one portion and the angular displacement between adjacent pressure chambers is constant.

11. A differential transmission comprising a casing containing lubricating fluid in its interior, a set of rotatable differential elements mounted in said casing, one of said rotatable differential elements and said casing have radially facing circumferential portions, one of said portions including a plurality of radially directed pressure chambers facing the other portion and containing fluid, the other of said portions including radially directed rise and fall cam surfaces, spring biased pistons in said pressure chambers urged into engagement with said cam surfaces for reciprocation in response to rotation of said one rotatable differential element relative to said casing, said pressure chambers being a plurality of sets, restrictive passage means providing fluid communication between the plurality of sets of pressure chambers, flow control means in said restrictive passage means for controlling the rate of fluid flow between the sets of pressure chambers, said flow control means being removable for replacement selectively by a flow control means of a different capacity, each said flow control means comprising a hollow screw threadedly secured lengthwise of a portion of said passage means, and a pin extending through said screw, said pin having a smaller cross section than the corresponding cross section of the hollow interior of said screw so that restricted amounts of liquid can pass between said pin and the surrounding hollow screw, said pressure chambers and said cam surfaces being arranged so that when rotation occurs between said casing and said one element the pistons reciprocate to transfer the fluid in the pressure chambers back and forth therebetween via said passage means to the extent permitted by said passage means, and unidirectional passage means in communication with the interior of said case and said chambers for supplying fluid to said chambers in response to reciprocating movements of said pistons.

References Cited

UNITED STATES PATENTS

| | | | |
|---|---|---|---|
| 2,397,374 | 3/1946 | Schlicksupp | 74—711 |
| 2,722,140 | 11/1955 | Cabell | 74—711 |
| 2,808,739 | 10/1957 | Mueller | 74—711 |
| 2,861,477 | 11/1958 | Mueller | 74—711 |
| 2,978,929 | 4/1961 | Roberts | 74—711 |
| 3,015,970 | 1/1962 | Mueller | 74—711 |
| 3,040,600 | 6/1962 | Mueller | 74—711 |
| 3,230,795 | 1/1966 | Mueller | 74—711 |

ARTHUR T. McKEON, *Primary Examiner.*